(12) United States Patent
Petrenko et al.

(10) Patent No.: US 8,183,740 B2
(45) Date of Patent: May 22, 2012

(54) PIEZOELECTRIC MOTOR WITH HIGH TORQUE

(75) Inventors: Serhiy Petrenko, Kiev (UA); Valentin Rangelov Zhelyaskov, Sarasota, FL (US)

(73) Assignee: Discovery Technology International, Inc., Sarasota, FL (US)

( * ) Notice: Subject to any disclaimer, the term of this patent is extended or adjusted under 35 U.S.C. 154(b) by 91 days.

(21) Appl. No.: 12/639,232

(22) Filed: Dec. 16, 2009

(65) Prior Publication Data
US 2010/0148630 A1 Jun. 17, 2010

Related U.S. Application Data

(60) Provisional application No. 61/138,442, filed on Dec. 17, 2008.

(51) Int. Cl.
*H01L 41/08* (2006.01)
(52) U.S. Cl. ......... 310/323.02; 310/323.04; 310/323.05; 310/323.09
(58) Field of Classification Search . 310/323.02–323.09
See application file for complete search history.

(56) References Cited

U.S. PATENT DOCUMENTS

| | | | |
|---|---|---|---|
| 3,603,706 A | 9/1971 | Cermak et al. | |
| 3,963,380 A | 6/1976 | Thomas, Jr. et al. | |
| 4,344,743 A | 8/1982 | Bessman et al. | |
| 4,352,636 A | 10/1982 | Patterson et al. | |
| 4,453,103 A | 6/1984 | Vishnevsky et al. | |
| 4,478,217 A | 10/1984 | Shimada et al. | |
| 4,648,807 A | 3/1987 | Tippetts et al. | |
| 4,909,212 A | 3/1990 | Minowa et al. | |
| 4,959,580 A * | 9/1990 | Vishnevsky et al. | 310/323.02 |
| 5,036,944 A | 8/1991 | Danley et al. | |
| 5,172,023 A * | 12/1992 | Kawai et al. | 310/323.04 |

(Continued)

FOREIGN PATENT DOCUMENTS

JP 63089074 A 4/1988

(Continued)

OTHER PUBLICATIONS

Leletty, R., et al., "Valves Based on Amplified Piezoelectric Actuators" [online], [retrieved on Jun. 20, 2011]. Retrieved from the Internet: http://www.cedrat.com/fileadmin/user_upload/cedrat_groupe/Publications/Publications/2002/06/Actuator2002_A4-6_VALVES-BASED-ON-AMPLIFIED-PIEZOELECTRIC-ACTUATORS.pdf.

(Continued)

*Primary Examiner* — J. San Martin
(74) *Attorney, Agent, or Firm* — Fox Rothschild, LLP; Robert J. Sacco

(57) ABSTRACT

A piezoelectric motor (100) includes a stator (2) having a stator shaft (9). The motor also includes an annular piezoelement (4) having upper and lower surfaces and inner and outer rims retained on the stator. The motor further includes an annular wave shell (6) on an outer rim of the piezoelement and a rotor coupled to the stator shaft, where the rotor has a rotor inner circumferential surface (20). The motor additionally includes elastic pushers (8), each having an end coupled to the wave shell and another end extending to and contacting the rotor inner circumferential surface. In the motor, a radius of the outer rim is at least twice the radius of the inner rim and an annular width of the piezoelement is at least twice its thickness.

20 Claims, 3 Drawing Sheets

U.S. PATENT DOCUMENTS

| | | | |
|---|---|---|---|
| 5,258,239 | A | 11/1993 | Kobayashi |
| 5,362,213 | A | 11/1994 | Komatsu et al. |
| 5,604,392 | A | 2/1997 | Vig |
| 5,726,518 | A * | 3/1998 | Takagi ..................... 310/323.05 |
| 5,839,467 | A | 11/1998 | Saaski et al. |
| 5,877,579 | A | 3/1999 | Zumeris |
| 6,116,257 | A | 9/2000 | Yokota et al. |
| 6,230,738 | B1 | 5/2001 | Watanabe et al. |
| 6,260,579 | B1 | 7/2001 | Yokota et al. |
| 6,467,350 | B1 | 10/2002 | Kaduchak et al. |
| 6,469,420 | B2 * | 10/2002 | Iarochenko et al. ..... 310/323.02 |
| 6,575,669 | B2 | 6/2003 | Takasan |
| 6,715,731 | B1 | 4/2004 | Post et al. |
| 6,964,327 | B2 | 11/2005 | Chang et al. |
| 7,095,160 | B2 * | 8/2006 | Uchino et al. ................. 310/333 |
| 7,219,848 | B2 | 5/2007 | Sweeton |
| 7,395,607 | B1 | 7/2008 | Broderick et al. |
| 7,876,022 | B2 * | 1/2011 | Petrenko et al. ......... 310/323.03 |
| 2001/0013740 | A1 | 8/2001 | Fukui et al. |
| 2001/0022485 | A1 | 9/2001 | Oda et al. |
| 2002/0017831 | A1 | 2/2002 | Iarochenko et al. |
| 2002/0033651 | A1 | 3/2002 | Iarochenko et al. |
| 2004/0013740 | A1 | 1/2004 | Weickmann |
| 2004/0027032 | A1 | 2/2004 | Moteki et al. |
| 2004/0189150 | A1 | 9/2004 | Yamamoto et al. |
| 2004/0256956 | A1 | 12/2004 | Miyazawa |
| 2005/0012433 | A1 | 1/2005 | Brady et al. |
| 2005/0151107 | A1 | 7/2005 | Shu |
| 2005/0268921 | A1 | 12/2005 | Zumeris et al. |
| 2006/0006764 | A1 | 1/2006 | Ganor et al. |
| 2006/0244341 | A1 | 11/2006 | Uchino et al. |
| 2007/0119505 | A1 | 5/2007 | Petrenko |
| 2009/0121586 | A1 * | 5/2009 | Kesil ........................ 310/323.02 |
| 2010/0148102 | A1 | 6/2010 | Petrenko et al. |
| 2010/0148630 | A1 | 6/2010 | Petrenko et al. |
| 2010/0150754 | A1 | 6/2010 | Petrenko et al. |
| 2010/0156240 | A1 | 6/2010 | Petrenko et al. |
| 2010/0289362 | A1 | 11/2010 | Petrenko et al. |
| 2011/0050038 | A1 | 3/2011 | Zhelyaskov et al. |

FOREIGN PATENT DOCUMENTS

| | | |
|---|---|---|
| JP | 06-205590 A | 7/1994 |
| JP | 10-117486 A | 5/1998 |
| JP | 10-27854 A | 10/1998 |
| JP | 11-252955 | 9/1999 |
| JP | 2000-323763 A | 11/2000 |
| JP | 2004-312810 A | 11/2004 |
| JP | 2006-299889 A | 11/2006 |
| KR | 2005-0007944 A | 1/2005 |
| KR | 2006-0097831 A | 9/2006 |
| KR | 10-0728510 B1 | 6/2007 |
| KR | 2009-0054728 A | 6/2009 |
| SU | 1782316 A3 | 12/1992 |
| SU | 1825435 A3 | 6/1993 |
| UA | 4169 | 2/1993 |
| WO | WO-2007-064310 A1 | 6/2007 |
| WO | WO-2008057061 A2 | 5/2008 |

OTHER PUBLICATIONS

International Search Report mailed Feb. 24, 2010; Application Serial No. PCT/US2009/068217 in the name of Discovery Technology International, LLP.

Lindler, J.E., et al. "Piezoelectric Direct Drive Servovalve" CSA Engineering, Mountain View, CA., "Industrial and Commercial Applications of Smart Structures Technologies", San Diego, CA Mar. 2000.

International Search Report mailed Aug. 13, 2010; Application Serial No. PCT/US2009/068294 in the name of Discovery Technology International, LLPP et al.

International Search Report mailed Sep. 28, 2010; Application Serial No. PCT/US2010/023470 in the name of Discovery Technology International, LLPP et al.

Kasatkin, A. S. "Asynchronous Brushless Machines", Fundamentals of Electronics. Moscow Energy. 1966. Ch. 17, pp. 484-487.

Kasatkin, A.S. "Commutator Machines", Fundamentals of Electronics. Moscow Energy. 1966, Ch. 18, pp. 540-543.

Maleev, P. I. "Gyroscopes with Electrical Suspension of Rotor", New Types of Gyroscopes, Leningrad, Sudostroenie, 1971, p. 9 and p. 31.

Information about Related Patents and Patent Applications, see section 6 of the accompanying Information Disclosure Statement Letter, which concerns Related Patents and Patent Applications.

International Search Report mailed May 18, 2011 in International Application Serial No. PCT/US2010/047494 in the name of Discovery Technology International, LLLP, et al.

International Search Report Mailed Dec. 27, 2010 in International Application No. PCT/US2010/35156 in the name of Discovery Technology International, LLLC.

Ermakov, V.S., et al., "Problems and ways of Improvements of Modulation Gyro with Spherical Gas-Lubricated Spin-Axis Bearing System," proceedings of teh VII St. Petersburg International Conference on Integrated Navigation Systems, St. Petersburg, Russia, May 29-31, 2000, pp. 196-199.

* cited by examiner

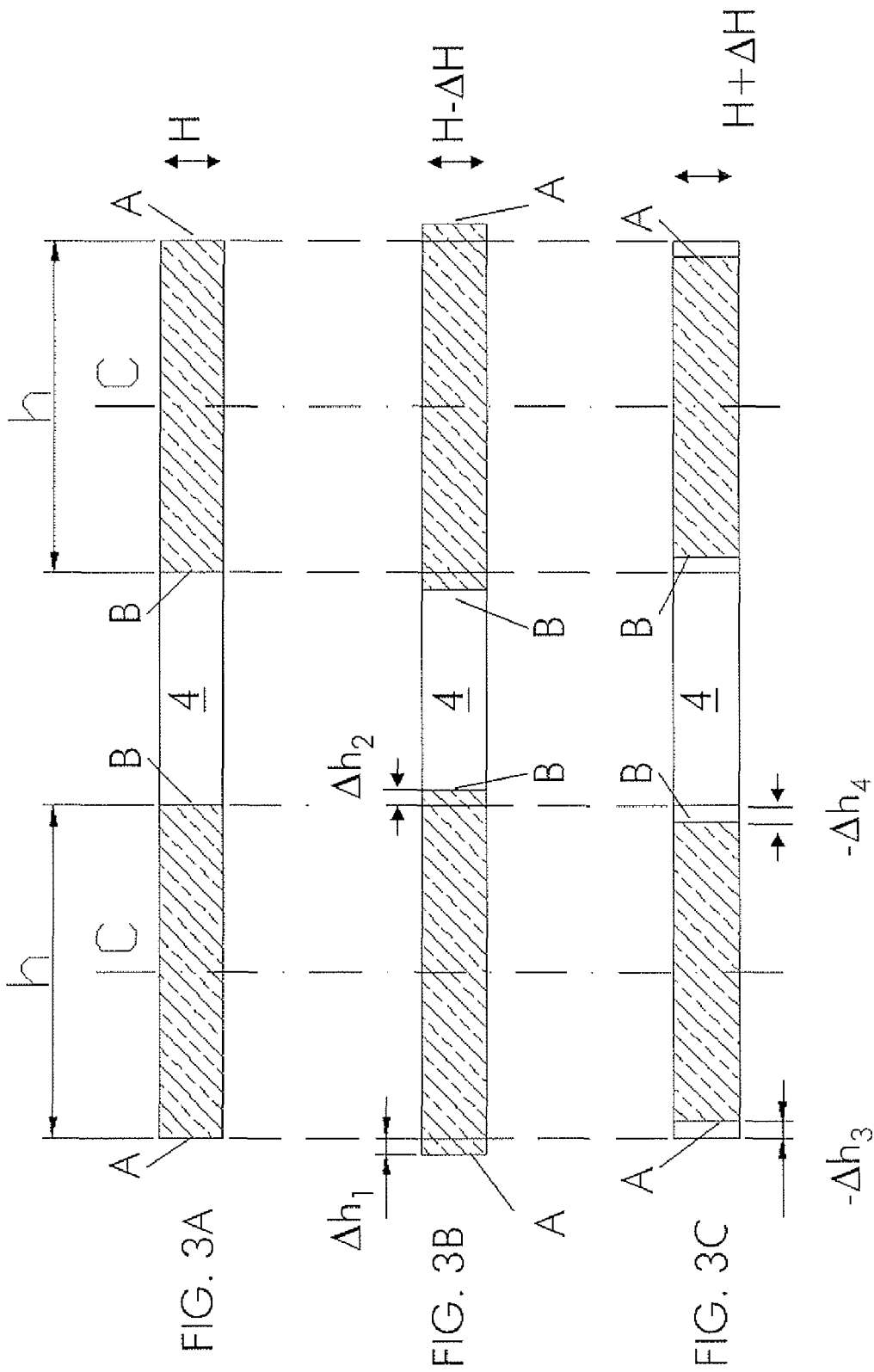

PIEZOELECTRIC MOTOR WITH HIGH TORQUE

CROSS REFERENCE TO RELATED APPLICATIONS

This application is a non-provisional patent application claiming the benefit of U.S. Patent Application No. 61/138,442 filed on Dec. 17, 2008. The entirety which is incorporated herein by reference.

FIELD OF THE INVENTION

The invention relates to the piezoelectric motor industry and concerns the design of a rotary piezoelectric motor with high torque for use as an actuator in various industrial start-stop systems.

BACKGROUND OF THE INVENTION

Various piezoelectric motor designs are known in which a stator and rotor interact through pushers by friction. For example, in some conventional piezoelectric motor designs, a rotor and stator based on an annular piezoelement are provided, where the outer cylindrical surface is installed in a wave shell, on which a set of pushers are mounted. Improved reliability of such a motor is realized because the pushers are installed on a separate acoustic-wave conducting shell (wave shell) which is mounted on the piezoelement rather than fitted to slots cut directly into the relatively more fragile annular piezoelement. Also by matching the radial resonance frequency of the wave shell to the radial resonance frequency of the annular piezoelement an improvement in the energy efficiency of the system is achieved. Such a device is excited at the zero order radial mode of vibration of the annular piezoelement, which is considered most effective in terms of amplitude and the quality factor (Q factor) of the whole system.

SUMMARY

Embodiments of the invention concern rotary piezoelectric motors. In one embodiment of the invention, a piezoelectric motor is provided. The motor includes a stator having a stator shaft defining a rotational axis. The motor also includes an annular piezoelement having opposing upper and lower surfaces and inner and outer rims, where the annular piezoelement retained on the stator and about the rotational axis, and where the annular piezoelement comprising a piezoelectric material. The motor further includes an annular wave shell retained on an outer rim of the annular piezoelement and a rotor rotatably and mechanically coupled to the stator shaft, where the rotor has a rotor inner circumferential surface. The motor additionally includes a plurality of elastic pushers, where each of the plurality of pushers has a first end mechanically coupled to the annular wave shell and a second end extending to and contacting the rotor inner circumferential surface. In the motor, a radius of the outer rim (Rp) is at least twice the radius of the inner rim (rp), an annular width of the annular piezoelement (Rp–rp) is at least twice a thickness of the annular piezoelement, and the wave shell is operable to transfer oscillations of the annular piezoelement in the radial direction to the plurality of pushers to effect rotary movement of the rotor about the rotational axis.

BRIEF DESCRIPTION OF THE FIGURES

FIG. 3A is a cross-section side view of the piezoelectric element in FIG. 1 in an unexcited state.

FIG. 3B is a cross-section side view of the piezoelectric element in FIG. 1 in an excited state resulting in radial expansion.

FIG. 3C is a cross-section side view of the piezoelectric element in FIG. 1 in an excited state resulting in radial compression.

DETAIL DESCRIPTION

Figure 1:
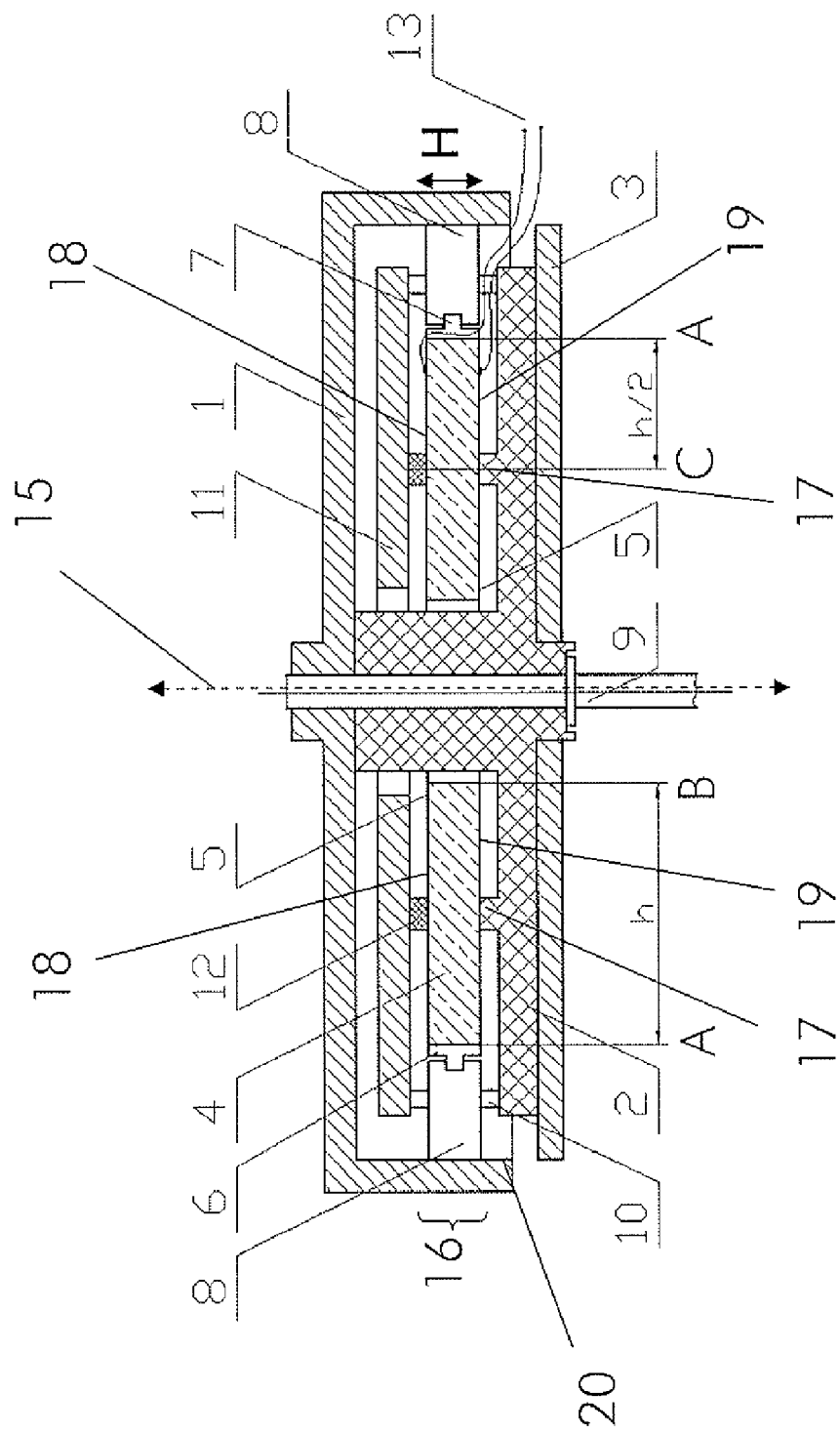
FIG. 1 is a cross-section side view of an exemplary piezoelectric motor configured in accordance with an embodiment of the present invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention provide a new design for a rotary piezoelectric motor including a ring-shaped or annular piezoelement. In general, the frequency of the radial mode of a ring-shaped resonator $F_r^R$ is described by the equation:

$$F_r^R = \frac{1}{ad\pi}\sqrt{\frac{n^2+1}{\rho * s_{jk}}} \quad (1)$$

where d is an average diameter of the ring (in particular the diameter of the piezoelectric ring), $s_{jk}$ is the coefficient of elasticity of the material (in particular the material of the piezoelectric ring), a is the form factor of the ring (in particular the form factor of the piezoelectric ring) which is determined experimentally, ρ is density of the material (in particular, density of the piezoelectric ring), and n is an integer ≧0 and specifying the order of the vibrational mode. In the case of zero order radial vibrational mode (1) can be transformed into the equation:

$$F_r^R = c_p/2 \times \pi[(R_p+r_p)/2], \quad (2)$$

where $c_p$ is the speed of propagation of sound waves in the material, $R_p$ is the outside radius of the annular piezoelement, and $r_p$ is the inner radius of the annular piezoelement.

One significant disadvantage of conventional piezoelectric motor designs, including annular piezoelectric elements, is that such motors generally do not practically allow an increase in the torque of the motor beyond certain limits. In general, the increase in the torque of the motor is usually associated with an increase in the diameter of the rotor and, as a consequence, torque is usually increased via an increase in the diameter of the ring-shaped resonator. However, a significant disadvantage with this approach is that as the diameter of the annular piezoelement is increased, the frequency of its zero-order radial vibrational mode drops into the high-frequency end of the audible sound band. For example, for a conventional piezoelectric motor including an annular piezoelement with parameters $R_p=35$ mm, $r_p=20$ mm, and $c_p=3500$ m/s, the frequency of the zero-order mode of radial vibration is approximately 20,000 Hz. This frequency is at the boundary of the acoustic and ultrasonic frequencies. Any further increase in diameter of the annular piezoelement shifts the excitation frequency into the audible sound range that generally results in nuisance acoustic effects as far as users are concerned. Accordingly, increasing torque by simply increasing the diameter of the piezoelement is not generally desirable.

In conventional piezoelectric motors, the decrease in frequency is typically compensated for by reducing the internal radius of the annular piezoelement, thus increasing the annular width of the annular piezoelement. The term "annular width" as used herein, refers to the difference between the inner and outer radiuses of an annular piezoelement. This will lead to an increase in the excitation frequency according to equation (2), but in this case the system operates as a thick ring resonator (a thick ring here is defined by the annular width of the annular piezoelement) and the Q factor decreases rapidly. A similar situation arises when higher order radial excitation modes are used. In such instances, the Q factor of the annular piezoelement also decreases rapidly and the motor becomes less efficient.

Embodiments of the present invention provide a new design for a rotary piezoelectric motor with high torque. The new piezoelectric motor has a virtually instantaneous start (it reaches maximum torque within a few milliseconds), a high starting torque (at least 5 N·m), an overdrive-free design due to its inherent non-electromagnetic design, a high deceleration torque, and an enhanced operational capacity. Such a piezoelectric motor is different from conventional piezoelectric motors by being based on an annular piezoelement design and an operating excitation frequency which excites the first order longitudinal vibrational mode across the width of the annular piezoelement.

Figure 2:
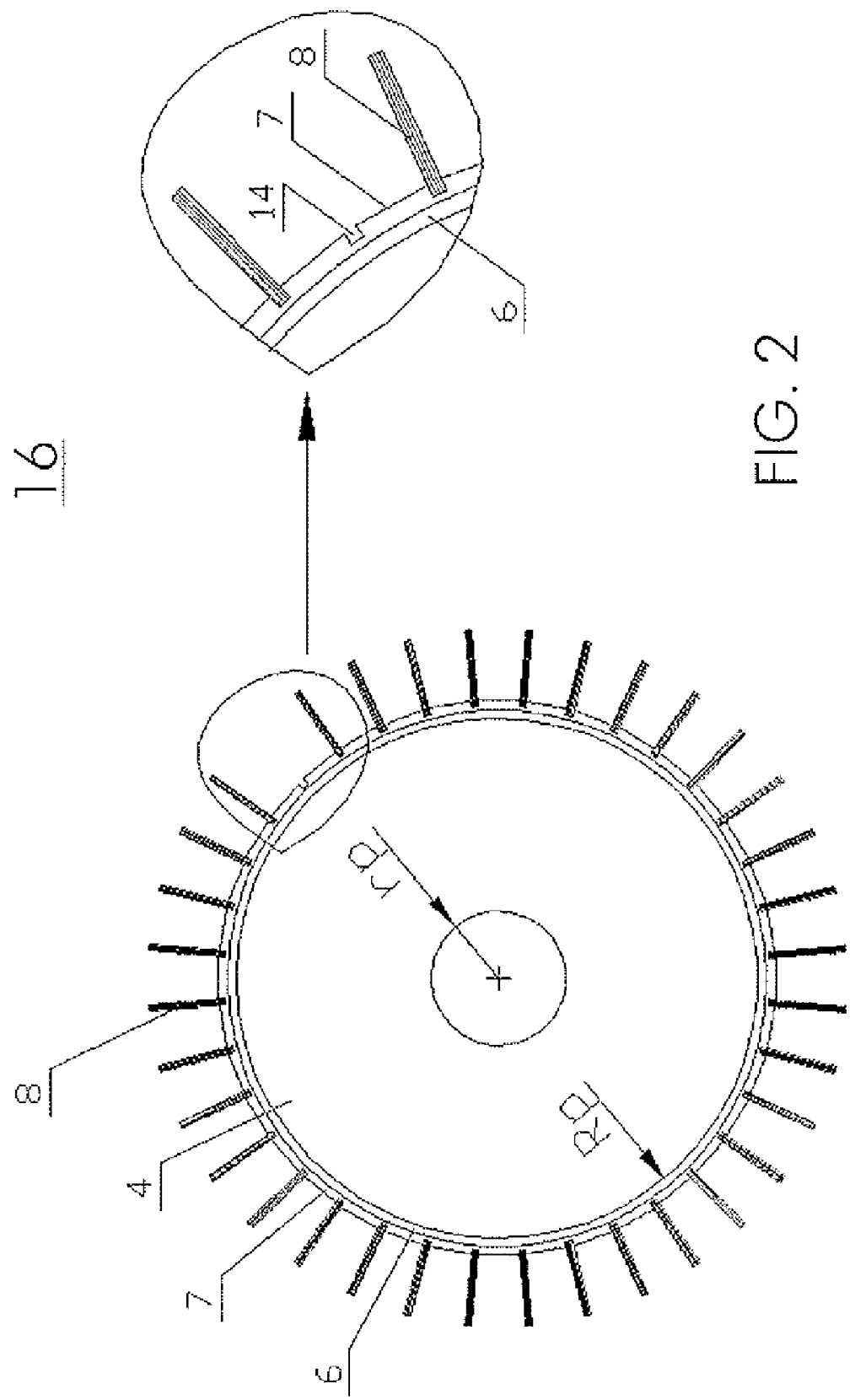
FIG. 2 is a top view of a subassembly of FIG. 1 including the piezoelectric element, the wave shell, and the pushers.

An exemplary embodiment of the new piezoelectric motor will be described with respect to FIGS. 1 and 2. FIG. 1 is a cross-section side view of the exemplary piezoelectric motor 100 configured in accordance with an embodiment of the present invention. FIG. 2 is a top view of a subassembly 16 of FIG. 1 including a piezoelectric element 4, a wave shell 6, and pushers 8. As shown in FIG. 1, the piezoelectric motor 100 includes a cylindrical rotor 1 and a flange or stator 2 having a rotational axis 15. The motor 100 can includes a stator base 3, mechanically coupled to the flange stator 2. A subassembly 16 can be mounted in the stator 2. The rotor 1 and the subassembly 16 can be mounted perpendicular to and about the rotational axis 15 so as to allow rotor 1 to rotate about axis 15.

As shown in FIG. 2, the subassembly 16 can include an annular piezoelement 4 with flat electrodes 5 and polarized normal to the surface area of the electrodes. Electrical conductor leads 13 can be electrically coupled to the annular piezoelement 4. The subassembly 16 can further include a wave shell 6, with T-cross-section including a reinforcing rib 7, surrounding the annular piezoelement 4. That is, the wave shell 6 is attached to an outer rim of the piezoelectric element. The wave shell 6 can be an elastic or deformable material, such as a metal or plastic. The subassembly 16 further includes a series of thin plate pushers 8, providing friction contact with the inner surface 20 of the rotor 1, attached to the wave shell 6. As described above, the pushers 8 can be grouped. For example, they can be assembled in packs of 2, 3, 4, etc.

As described above, the annular-shaped piezoelement 4, is mounted within an acoustic-wave conducting ring-shaped shell (wave shell) 6, with the outer cylindrical surface or rim A of the piezoelement 4 pressed firmly against the inner surface of the wave shell 6. In other words, the wave shell 6 is attached to and surrounds the outer rim A of the piezoelement 4. A set of pushers 8 fixed to the outer surface of the wave shell 6 makes friction-contact with the rotor 1. The annular piezoelement 4, when excited, acts as a ring-shaped resonator with longitudinal modes of vibration set up across its width (h). The external cylindrical surface of the piezoelement 4 is closely fitted within the wave shell 6, as described above. The wave shell 6 is elastic in its radial direction so that the vibrations of the piezoelement 4 are conducted to the rotor 1 via the pushers 8 on the outer surface of the wave shell 6. The piezoelement 4 is polarized normal to its flat end faces to which electrodes 13 which supply the excitation voltages are fixed.

In the various embodiments of the present invention, piezoelectric motors with increased torque are provided by improving the motor design parameters and at the same time eliminating the undesirable effects of any decrease in the Q factor. This is achieved by increasing the diameters of the rotor 1 and the piezoelectric ring-shaped resonator 4, while switching to a different excitation frequency, which excites the first order longitudinal vibrational mode across the annular width of the annular piezoelement 4. That is, the operating frequency of the applied voltage is selected to excite the first-order longitudinal mode of vibration radially across the annular width of the piezoelement 4. In particular, the Present Inventors have discovered that the operating frequency $F_r^R$ for the excitation voltage can be described by the equation:

$$F_r^P = c_p/2h, \quad (3)$$

where $c_p$ is the speed of propagation of the sound waves in the annular piezoelement material and h is the annular width of the annular piezoelement ($h=R_p-r_p$).

Increased efficiency in performance at the new vibrational mode is further achieved by the combination of two factors: (1) the use of the first order vibrational mode for excitation of the piezoelement 4, and (2) the use of a wave shell 6 formed as a thin-walled cylinder with T-shaped cross-section providing a ring-shaped reinforcing rib 7, as shown in FIGS. 1 and 2. The rib 7 serves as a mechanical amplifier (concentrator) of acoustic energy. That is, since the mass of the rib 7 is relatively small as compared to the mass of other portions of the wave shell 6 and the mass of the piezoelement 4, the acoustic energy generated by the vibrations of the piezoelement 4 and the wave shell is concentrated at the rib 7. The acoustic energy at the rib 7 is transferred to the pushers 8 to contact the inner surface 20 of the rotor 1 and subsequently cause motion of the rotor 1 due to friction forces between the pushers 8 and the inner surface 20 of the rotor 1 during operation of the motor 100. The pushers are mounted in slots 14 cut into the rib 7 at intervals around its circumference. The pushers 8 can be formed as either single plates or as small packs of plates in each of the slots 14. Each plate or stack of plates bears against the inner surface 20 of rotor 1. In embodiments where the pushers 8 are grouped into packs, the friction force between the pushers 8 and the inner surface 20 of the rotor 1 is increased, increasing torque of the motor 100.

In the various embodiments of the present invention, excitation of the first order vibrational longitudinal mode can be achieved by configuring the piezoelectric element 4 to have an outer radius ($R_p$) that is at least twice the inner radius ($r_p$)

(i.e., $R_p > 2r_p$) and an annular width (h) that is at least twice a thickness of said piezoelectric element (i.e. h>2H). Therefore, when excited using an alternating voltage having a frequency ($F_r^P$) equal to $c_p/2(R_p-r_p)$, the wave shell 6 is operable to efficiently transfer oscillations of said piezoelectric element 4 in said radial direction to the pushers 8 to effect rotary movement of the rotor 1 about the rotational axis 15 with a significantly higher amount of torque than observed in conventional piezoelectric motors including annular piezoelements. Furthermore, the piezoelement 4 can be polarized normal to its flat end surfaces and the electrodes 13 can be affixed to these flat end surfaces. For example, as shown in FIG. 1, electrodes 13 are coupled to the flat upper 18 and lower 19 surfaces of the annular piezoelement 4.

Accordingly, based on the relationships $R_p > 2r_p$ and h>2H for the piezoelement 4 and the piezoelectric material (which specifies $c_p$), dimensions for the annular piezoelement 4 for a particular excitation voltage frequency can be selected. For example, in embodiments where the piezoelement 4 is constructed from piezoceramics selected from the group of piezoelectric lead-zirconate-titanate-strontium ceramics (PZT) materials, the first order vibrational longitudinal mode across the width of the ring shell begins to form effectively when $R_p > 20$ mm, $r_p > 8$ mm, and thickness H=5-10 mm. However, the present invention is not limited to the use of PZT materials. In other embodiments of the present invention, other types of piezoelectric materials can be used.

As described above, the wave shell 6 can be formed as a thin-walled cylinder with T-shaped cross-section and ring-shaped reinforcing rib 7 with high stiffness along the periphery, which serves as a mechanical amplifier of acoustic energy. Furthermore, the reinforcing rib 7, as previously described, can have periodically spaced slots 14, in which pushers 8, formed as thin plates, are fixed with the opposite end of the pushers 8 pressed against the inner surface 20 of the rotor 1. In some embodiments, the pushers 8 secured in the slots 14 can have no direct acoustic contact (i.e., no rigid connection between the wave shell 6 and the pushers 8) with the thin-walled cylinder of the wave shell 6.

In the various embodiments of the present invention, mounting or holding of the annular piezoelement 4 in the motor 100 can be accomplished by using a pressure flange 11 acting through an elastic ring grommet or gasket 12. In general, when a mechanical component is placed in physical contact with a piezoelement, the Q factor is decreased due to dampening of vibration in the piezoelement. Therefore, in the various embodiments of the present invention, the configuration of the gasket 12 can be selected such that significant degradation in Q factor is limited. In particular, the gasket 12 can be configured to contact the annular piezoelement 4 in an area of minimum vibration speed. For example, as shown in FIG. 1, the annular piezoelement 4 can be contacted by the pressure flange 11 and gasket 12 at the mean between the inner and outer rims of the annular piezoelement 4. Furthermore, as the maximum mechanical tension generally occurs in the median area of the ring-shaped resonator (i.e., where the minimum in the vibrational speed arises), the gasket 12, which is acoustically coupled to the annular piezoelement 4, can also configured to withstand this mechanical tension. In general, a rubber or other elastomeric washer can be selected because it generally does not affect any parameters associated with the initial deformation in thickness of the piezoelement.

The stator 2 can include mounting features 14 (shown only in FIG. 2) for supporting the subassembly 16. The mounting features 17 can contact the annular piezoelement 4 at a point that is at the mean of the inner and outer radii (or rims) of the annular piezoelement 4, as described above and below, to minimize interference with the expansion and contraction of the annular piezoelement 4. The stator 2 can have a stator shaft 9 for mechanically and rotatably coupling the rotor 1 to the stator 2. A pressure flange 11 can be provided for providing mechanical pressure to the annular piezoelement 4 to hold it in place within motor 100, as described above. In some embodiments, threaded clips 10 for mounting the pressure flange 11 can be provided. Furthermore, a ring grommet or gasket 12, such as a rubber or other elastomeric ring, can be provided between the flange 11 and the piezoelement 4, as described above.

Operation of the motor 100 is described with respect to excitation of the piezoelectric element 4, as shown in FIGS. 3A-3C. FIG. 3A is a cross-section side view of the piezoelectric element 4 in FIG. 1 in an unexcited state. FIG. 3B is a cross-section side view of the piezoelectric element in FIG. 1 in an excited state resulting in radial expansion. FIG. 3C is a cross-section side view of the piezoelectric element 4 in FIG. 1 in an excited state resulting in radial compression.

In FIGS. 3A-3C, the piezoelectric element 4 has dimensions $R_p$ and $r_p$ so that an excitation voltage with frequency $F_r^P$ corresponds to the frequency of the first longitudinal mode across the annular width (h) of the annular piezoelement 4. Prior to applying the excitation voltage the annular width h of the piezoelement 4 is unchanged, as shown in FIG. 3A. Once the excitation voltage is applied to contacts 13, deformation begins. As shown in FIG. 3B, a lateral deformation ($-\Delta H$) can occur along the thickness (H) of the annular piezoelement 4. As a result of this initial lateral deformation and due to the elastic forces, at least some secondary deformation along the width of the annular piezoelement 4 is formed. This is transformed into a longitudinal standing wave radial deformation with maximum amplitude of the vibrations at the positions of the outer rim A and inner rim B of the annular piezoelement 4, and minimum amplitude of the vibrations at the midpoint between A and B, point C. (Point C defines at the median diameter of the ring, and determines the attachment points of the piezoelement resonator 4 to the stator 2, as described above.) The radial expansion of the piezoelement causes an increase in the annular width h, and this results in rims A and B moving in radially opposite directions by amounts $\Delta h_1$ and $\Delta h_2$, respectively, as shown in FIG. 3B As a result, the pushers 8 are pressed against the inner surface 20 of the rotor. In many cases, the rims A and B move symmetrically. That is, $\Delta h_1 = \Delta h_2$. However, in some cases, due to variations in the motor 100, $\Delta h_1 \neq \Delta h_2$. However, generally $\Delta h_1$ and $\Delta h_2$ will be within 5% to 10% of each other.

As the alternating excitation voltage is further applied to the piezoelement 4, compression of the width of the annular piezoelement 4 can subsequently occur, as shown in FIG. 3C. In contrast to FIG. 3B, the radial compression, which is symmetrical in respect to the medium radius point C, decreases the annular width h to decrease. The radial compression of the piezoelement causes a decrease in the annular width h, and this results in rims A and B moving in radially opposite directions by amounts $-\Delta h_3$ and $-\Delta h_4$, respectively, as shown in FIG. 3C. As a result, the pushers 8 are pulled away from the inner surface 20 of the rotor. In many cases, the rims A and B move symmetrically. That is, $-\Delta h_3 = -\Delta h_4$. However, in some cases, due to variations in the motor 100, $-\Delta h_3 \neq -\Delta h_4$. However, $-\Delta h_3$ and $-\Delta h_4$ will generally be within 5% to 10% of each other. Furthermore, in many cases, the symmetrical motion results in $|-\Delta h_3| = |-\Delta h_4| = \Delta h_1 = \Delta h_2$. However, due to variations in the motor 100, at least one of $|-\Delta h_3|$, $|-\Delta h_4|$, $\Delta h_1$, and $\Delta h_2$ can be different.

As a result, the pushers 8 are pulled away from the inner surface 20 of the rotor.

In operation, motor 100 works as described below. Initially, an alternating voltage with a frequency $F_r^P$, corresponding to the frequency of the first longitudinal mode across the annular width (h) of the piezoelement 4, is applied to contacts 13. In response to this voltage, a lateral deformation along the thickness (H) of the ring is formed initially, as described above with respect to FIG. 3. As a result of this initial lateral deformation and due to the elastic forces, a secondary deformation along the annular width (h) of the piezoelement 4 occurs, which is transformed into a longitudinal standing wave deformation with maximum amplitude of the vibrations at the outer A and inner B rims of the piezoelement 4 and minimum amplitude of the vibration at the medium radius point C. The vibrations cause stretching and compression of the piezoelement 5 along its annular width (h), resulting in displacement of at least the outer rim A, as described above with respect to FIG. 3. Since the outer rim A of the annular piezoelement 4 is closely fitted within the wave shell 6, the displacement (i.e., vibrations) of the outer rim A is transferred to the wave shell 6 and the vibrations are amplified by the reinforcing rib 7 because of the mass differences, as described above. The amplified vibrations then are transferred via the pushers 8 to the rotor, which then rotates. When vibrating, the pushers 8 are not acoustically coupled with the cylindrical portion of the wave shell 6. This is because of the differences in the masses of the cylindrical portion of the wave shell 6 and the reinforced rib 7, which results in a greater vibrational velocity at the rib 7 and therefore at the pushers 8.

Furthermore, the movement of the ends of the pushers, in contact with the rotor, constitute a nano-ellipse, is a result of two movements. The first movement along the length of the pusher is due to the excited longitudinal standing wave. The second movement, perpendicular to the pusher, is due to the elastic deformation of the pusher. The pushers are in contact with the rotor and move it by friction only during half of the nano-ellipse cycle. During the second half of the ellipse cycle, they retract and move to initial position, due to the elastic forces, without friction with the rotor. The amplitude of these nano-ellipses is typically in the tens or hundreds of nanometers.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A piezoelectric motor, comprising:
a stator having a stator shaft defining a rotational axis;
an annular piezoelement having opposing upper and lower surfaces and inner and outer rims, said annular piezoelement retained on said stator and about said rotational axis, and said annular piezoelement comprising a piezoelectric material;
an annular wave shell retained on an outer rim of said annular piezoelement;
a rotor rotatably and mechanically coupled to said stator shaft, said rotor having a rotor inner circumferential surface;
a plurality of elastic pushers, each of said plurality of pushers having a first end mechanically coupled to said annular wave shell and a second end extending to and contacting said rotor inner circumferential surface; and
a power supply coupled to said upper and lower surfaces of said annular piezoelement, said power supply operable to provide an alternating voltage that induces a first order longitudinal vibrational mode across said annular width;
wherein:
a radius of said outer rim ($R_p$) is at least twice the radius of said inner rim ($r_p$);
an annular width of said annular piezoelement ($R_p-r_p$) is at least twice a thickness of said annular piezoelement;
said wave shell is operable to transfer oscillations of said annular piezoelement in said radial direction to said plurality of pushers to effect rotary movement of said rotor about said rotational axis; and
said alternating voltage has a frequency ($F_{rP}$) approximately equal to $c_p/2(R_p-r_p)$, where $c_p$ is the speed of propagation of sound waves in said piezoelectric material.

2. The piezoelectric motor of claim 1, wherein said wave shell comprises a cylinder with a rib section, said rib section having a high stiffness along a periphery of said wave shell.

3. The piezoelectric motor of claim 2, wherein said plurality of pushers are mechanically coupled to said rib section of said wave shell.

4. The piezoelectric motor of claim 3, wherein said rib section comprises a plurality of slots for mechanically retaining said plurality of pushers.

5. The piezoelectric motor of claim 4, wherein at least one of said plurality of pushers is retained in each of said plurality of slots.

6. The piezoelectric motor of claim 1, further comprising at least one flange for retaining said annular piezoelement on said stator.

7. The piezoelectric motor of claim 5, further comprising at least one elastic gasket disposed between said flange and said annular piezoelement.

8. The piezoelectric motor of claim 6, wherein said upper and said lower surfaces of said annular piezoelement contact said flange and said stator at locations having a radius equal to $(R_p-r_p)/2$.

9. The piezoelectric motor of claim 1, wherein said piezoelectric material in said annular piezoelement is polarized in a radial direction normal to said upper and lower surfaces.

10. The piezoelectric motor of claim 1, wherein said piezoelectric material comprises a lead-zirconate-titanate-strontium ceramic (PZT) material.

11. A piezoelectric motor, comprising:
a stator having a stator shaft defining a rotational axis;
an annular piezoelement having opposing upper and lower surfaces and inner and outer rims, said annular piezoelement retained on said stator and about said rotational axis, and said annular piezoelement comprising a piezoelectric material;
an annular wave shell retained on an outer rim of said annular piezoelement;
a rotor rotatably and mechanically coupled to said stator shaft, said rotor having a rotor inner circumferential surface; and
a plurality of elastic pushers, each of said plurality of pushers having a first end mechanically coupled to said annular wave shell and a second end extending to and contacting said rotor inner circumferential surface; wherein:
a radius of said outer rim ($R_p$) is at least twice the radius of said inner rim ($r_p$);
an annular width of said annular piezoelement ($R_p-r_p$) is at least twice a thickness of said annular piezoelement;
said wave shell is operable to transfer oscillations of said annular piezoelement in said radial direction to said plurality of pushers to effect rotary movement of said rotor about said rotational axis; and
said piezoelement is configured to vibrate in a first order longitudinal vibrational mode across said annular width when subjected to an alternating voltage having a frequency ($F_{rP}$) approximately equal to $c_p/2(R_p-r_p)$, where $c_p$ is the speed of propagation of sound waves in said piezoelectric material.

12. The piezoelectric motor of claim 11, further comprising: a power supply coupled to said upper and lower surfaces of said annular piezoelement, said power supply providing an alternating voltage for inducing the first order longitudinal vibrational mode across said annular width.

13. The piezoelectric motor of claim 12, wherein said alternating voltage has the frequency ($F_{rP}$) approximately equal to $c_p/2(R_p-r_p)$.

14. The piezoelectric motor of claim 11, wherein said wave shell comprises a cylinder with a rib section, said rib section having a high stiffness along a periphery of said wave shell.

15. The piezoelectric motor of claim 14, wherein said plurality of pushers are mechanically coupled to said rib section of said wave shell.

16. The piezoelectric motor of claim 15, wherein said rib section comprises a plurality of slots for mechanically retaining said plurality of pushers.

17. The piezoelectric motor of claim 11, further comprising at least one flange for retaining said annular piezoelement on said stator.

18. The piezoelectric motor of claim 11, wherein said upper and said lower surfaces of said annular piezoelement contact said flange and said stator at locations having a radius equal to $(R_p-r_p)/2$.

19. The piezoelectric motor of claim 11, wherein said piezoelectric material in said annular piezoelement is polarized in a radial direction normal to said upper and lower surfaces.

20. The piezoelectric motor of claim 11, wherein said piezoelectric material comprises a lead-zirconate-titanate-strontium ceramic (PZT) material.

* * * * *